(12) United States Patent
Schwille et al.

(10) Patent No.: US 12,369,763 B2
(45) Date of Patent: Jul. 29, 2025

(54) METHOD FOR CONTROLLING A SUCTION DEVICE

(71) Applicant: Robert Bosch GmbH, Stuttgart (DE)

(72) Inventors: Matthias Christian Schwille, Tuebingen (DE); Wolfgang Herberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 17/758,781

(22) PCT Filed: Dec. 23, 2020

(86) PCT No.: PCT/EP2020/087733
§ 371 (c)(1),
(2) Date: Jul. 13, 2022

(87) PCT Pub. No.: WO2021/144129
PCT Pub. Date: Jun. 22, 2021

(65) Prior Publication Data
US 2023/0040686 A1 Feb. 9, 2023

(30) Foreign Application Priority Data
Jan. 16, 2020 (DE) .................. 10 2020 200 483.8

(51) Int. Cl.
*A47L 9/28* (2006.01)
*A47L 7/00* (2006.01)
(Continued)

(52) U.S. Cl.
CPC ............. *A47L 7/0095* (2013.01); *A47L 9/248* (2013.01); *A47L 9/2805* (2013.01);
(Continued)

(58) Field of Classification Search
CPC ...... A47L 7/0095; A47L 9/248; A47L 9/2805; A47L 9/2842; A47L 9/2894; G01P 15/18
See application file for complete search history.

(56) References Cited

U.S. PATENT DOCUMENTS

2014/0008087 A1   1/2014   Brown et al.

FOREIGN PATENT DOCUMENTS

DE   10 2010 040 336 A1   3/2012
DE   10 2013 002 251 A1   8/2013
(Continued)

OTHER PUBLICATIONS

Young (Jonathan C Young, Vibration Analysis Using a MEMS Accelerometer, Dec. 2006, Naval Postgraduate School, Monterey, California) (Year: 2006).*
(Continued)

*Primary Examiner* — Michael W Choi
(74) *Attorney, Agent, or Firm* — Maginot, Moore & Beck LLP

(57) ABSTRACT

A method for controlling a suction device, in which the suction device includes at least one electric motor at least for generating a suction function, includes at least detecting vibration data on a suction hose of the suction device, evaluating the vibration data by comparing it with comparison data and generating a comparison result, and controlling the electric motor in accordance with the comparison result.

11 Claims, 2 Drawing Sheets

(51) Int. Cl.
*A47L 9/24* (2006.01)
*G01P 15/18* (2013.01)

(52) U.S. Cl.
CPC ........... *A47L 9/2842* (2013.01); *A47L 9/2894* (2013.01); *G01P 15/18* (2013.01)

(56) References Cited

FOREIGN PATENT DOCUMENTS

| | | |
|---|---|---|
| DE | 10 2012 105 845 A1 | 1/2014 |
| DE | 10 2013 018 278 A1 | 4/2015 |
| DE | 10 2017 205 072 A1 | 9/2018 |
| DE | 10 2017 115 436 A1 | 1/2019 |
| DE | 10 2017 218 852 A1 | 4/2019 |
| JP | 2021067495 A * | 4/2021 |

OTHER PUBLICATIONS

International Search Report corresponding to International Patent Application No. PCT/EP2020/087733; mailed Mar. 17, 2021 (5 pages).

* cited by examiner

METHOD FOR CONTROLLING A SUCTION DEVICE

This application is a 35 U.S.C. § 371 National Stage Application of PCT/EP2020/087733, filed on Dec. 23, 2020, which claims the benefit of priority to Serial No. DE 10 2020 200 483.8, filed on Jan. 16, 2020 in Germany, the disclosures of which are incorporated herein by reference in their entirety.

The present disclosure relates to a method for controlling a suction device, the suction device comprising at least one electric motor for at least producing a suction function.

BACKGROUND

DE 10 2010 040 336 A1 already discloses a method for controlling a vacuum cleaner.

SUMMARY

The present disclosure is based on a method for controlling a suction device, the suction device comprising at least one electric motor for at least producing a suction function, comprising at least the method steps of capturing vibration data at a suction hose of the suction device, evaluating the vibration data by comparing them with comparison data and producing a comparison result, and controlling the electric motor on the basis of the comparison result.

The disclosure provides a method that increases user convenience by providing an autostart function for suction devices, regardless of whether the suction device has a suction device mains socket on the suction device housing. The autostart function for mains-operated suction devices having the suction device mains socket on the suction device housing is sufficiently well known from the prior art. Mains-operated suction devices allow a mains-operated electric machine tool to be connected to the suction device mains socket. The autostart function allows the mains-operated suction device to start automatically as soon as a load-dependent current is present at the suction device mains socket. This load-dependent current is present as soon as the mains-operated electric machine tool is operated. The way in which the autostart function works on mains-operated suction devices having the suction device mains socket, in particular when using the mains-operated electric machine tool, is sufficiently well known to a person skilled in the art, for which reason it is not discussed in more detail here. In contrast to the prior art, the present disclosure provides the solution to the problem of providing the autostart function for any machine tools, regardless of a power supply of the machine tool. As a result, the disclosure is able to provide the autostart function for, by way of example, battery-operated, mains-operated or pneumatically operated machine tools, in particular handheld machine tools. The suction device according to the disclosure is therefore universally usable with essentially any machine tool, in particular handheld machine tool. Within the context of the present disclosure, "universally" means that the suction device according to the disclosure provides the autostart function regardless of a machine tool manufacturer and regardless of a specific power supply of the machine tool. The suction device according to the disclosure is therefore compatible and usable for essentially any machine tool. The method takes the comparison result for the vibration data as a basis for controlling the electric motor and therefore provides the autostart function for the machine tool.

In particular, the method according to the disclosure allows the autostart function to be provided for any desired suction devices, both mains-connected and battery-operated suction devices, when used with any desired machine tools, in particular handheld machine tools, both mains-connected and battery-operated machine tools. This means that the autostart function is able to be provided for the random suction devices across manufacturers.

Within the context of the present disclosure, "controlling the electric motor" is intended to be understood to mean switching on the electric motor, switching off the electric motor, regulating a power of the electric motor, increasing the power of the electric motor or reducing the power of the electric motor.

While it is operating, the machine tool, in particular the handheld machine tool, produces vibrations and undergoes accelerations. The vibrations and/or the accelerations may be produced for example by rotation of a machine tool motor, movement of the machine tool, at least partial turning of the machine tool and/or machining of a workpiece. Examples of machine tools are a table circular saw, a belt sander, a table plane and other machine tools that appear meaningful to a person skilled in the art. Examples of handheld machine tools in this case are a screwdriver, in particular a cordless screwdriver or a mains-operated screwdriver, an impact driver, a drywall screwdriver, a hammer drill, a rotary hammer, a core drill machine, an angle grinder, an eccentric grinder, an orbital sander, a fret saw, a demolition hammer, a handheld circular saw, a handheld plane or other handheld machine tools sufficiently well known to a person skilled in the art. If the machine tool is connected to the suction device by way of the suction hose of the suction device, the vibrations of the machine tool may be transferred to the suction device.

The suction device is preferably a battery-operated suction device that is operable by means of at least one rechargeable battery, in particular by means of a handheld machine tool battery pack. As a result, electric power is then provided by a power supply unit of the suction device by means of the at least one rechargeable battery. Within the context of the present disclosure, a "handheld machine tool battery pack" is intended to be understood to mean a combination of at least one battery cell and a battery pack housing. The handheld machine tool battery pack is advantageously designed to supply power to commercially available battery-operated handheld machine tools. The at least one battery cell may be in the form of an Li ion battery cell with a rated voltage of 3.6 V, for example. By way of example, the handheld machine tool battery pack has at least five battery cells and a total rated operating voltage of 18 V in order to allow the suction device to be operated with due performance. Alternatively, the suction device may be a mains-operated suction device that is connectable to an external mains socket by means of a power supply cable. The external mains socket is able to provide a voltage of for example 100 V, 110 V, 120 V, 127 V, 220 V, 230 V or 240 V at 50 Hz or 60 Hz, but also a three-phase AC voltage. The possible configurations of the external mains socket and the available voltages connected thereto are sufficiently well known to a person skilled in the art.

The electric motor produces the suction function as soon as the electric motor is supplied with electric power from the power supply unit. When the electric motor is supplied with electric power, it is able to produce at least one suction stream essentially through the suction device housing and, as a result, to suck in particles and/or liquids by way of the suction hose. The suction hose has at least one suction opening and is preferably able to be attached to the suction device housing in a reversibly detachable manner. The suction opening is designed to use the suction stream to pick up particles produced during operation of the suction device. Moreover, the suction hose is connectable, preferably connectable in a reversibly detachable manner, to a machine tool, in particular a handheld machine tool. The suction hose is designed to transport the particles produced, in particular dirt particles, away from a work surface, a work region or a work area of the machine tool by way of the suction opening during operation of the machine tool.

The vibrations and/or accelerations described at the outset may be produced, by way of illustration, by movement of the suction hose, at least partial turning of the suction hose, connection of the suction hose to the machine tool, rotation of the electric motor of the suction device or the like. The vibrations and/or accelerations are transferred directly to the sensor module arranged on the suction hose and are detected by said sensor module. The vibrations may be represented as a one-, two- or three-component vector, for example, which means that the vibrations comprise one, two or three spatial directions, for example.

In order for the sensor module to be able to capture the vibration data, the sensor module is associated with the suction hose. In this case, the sensor module is preferably arranged at, in particular attached to, an end region of the suction hose that faces away from the suction device. The sensor module is particularly preferably arranged close to the suction opening. The sensor module may be attached to the suction hose and mechanically connected thereto. Within the context of the present disclosure, "mechanically connected" means that there is a force-fit, form-fit and/or material-locking connection, said connection being able to be configured to be detachable or non-detachable.

One method step comprises capturing vibration data at the suction hose of the suction device. To capture the vibration data, the suction hose may have at least one sensor module for detecting vibrations and/or accelerations. The sensor module is able to detect the vibrations and/or accelerations of the machine tool, in particular the handheld machine tool, and/or the vibrations and/or accelerations of the suction hose. The sensor module may be in the form of at least one acceleration sensor that detects the vibrations during operation of the machine tool and/or the suction device. By way of illustration, the acceleration sensor may be in the form of a gyroscope, a compass or a magnetic field sensor. The sensor module is essentially able to capture vibration values and/or acceleration values from up to three spatial directions. The sensor module may comprise a microcontroller or a microprocessor for evaluating the vibration data. The sensor module is intended to detect the vibrations and/or accelerations of the machine tool and/or of the suction device and to convert them into the vibration data. The vibration data may be represented as three-component vectors for different times. As such, the vibration data may be in the form of a time-dependent data series for different times having one, two or three components for one, two or three spatial directions. The sensor module is designed in such a way that it is able to translate the three-component vibrations at the suction hose into three-component vibration data. Moreover, the sensor module is designed to detect the vibrations continuously, with the result that the vibrations are translated into the vibration data continuously. It is also conceivable for the sensor module to detect the vibrations and translate them into the vibration data at, in particular variable, intervals of time. The vibration data may be captured as a vibration spectrum, the vibration data for a respective spatial direction being able to be evaluated in a time-dependent manner. The vibration spectrum may therefore be regarded as a time characteristic of the vibrations over the time axis.

One method step comprises transmitting the captured vibration data or the comparison result from the suction hose to the suction device by using a communication connection. As such, for example the captured vibration data may be transmitted from the sensor module to the suction device by way of the communication connection so that the suction device performs the evaluation of the captured vibration data. By way of illustration, it is also conceivable for the sensor module to perform the evaluation of the captured vibration data and for the comparison result to be transmitted to the suction device by way of the communication connection. The communication connection may be line-based, in particular by means of a communication line between the sensor module and the suction device. By way of example, the communication line may be a communication cable or at least one conductor track on at least one printed circuit board. The communication connection then connects the sensor module to the suction device by way of at least one communication interface so that at least a unilateral flow of communication can take place; at least a bilateral flow of communication would also be possible. Within the context of the present disclosure, "unilateral flow of communication" means that at least one communication signal can be transmitted from the sensor module to the suction device and there is essentially no communication from the suction device to the sensor module. "Bilateral flow of communication" is intended to be understood to mean bidirectional communication between the sensor module and the suction device, with the result that it is possible both for at least one communication signal to be transmitted from the sensor module to the suction device and for at least one further communication signal to be transferred from the suction device to the sensor module. Moreover, it is possible for the communication connection between the sensor module and the suction device to be in wireless form. The wireless communication connection may be in the form of Bluetooth, WLAN, infrared, near field communication (NFC) by means of RFID technology, and further wireless communication connections with which a person skilled in the art is familiar. Communication protocols used in this instance may be Bluetooth Smart, GSM, UMTS, LTE, ANT, ZigBee, LoRa, SigFox, NB-IoT, BLE, IrDA, and further communication protocols with which a person skilled in the art is familiar.

The sensor module has a sensor module power supply designed to supply the sensor module with electric power. In this case, the sensor module power supply may be connected to the suction device by means of a power supply line so that the sensor module power supply is supplied with electric power by way of the suction device. It is also possible for the sensor module power supply to be supplied with electric power by way of the power supply of the machine tool, in particular handheld machine tool, such as for example the rechargeable battery, in particular the handheld machine tool battery pack. It is also conceivable for the sensor module power supply to be supplied with electric power by way of at least one battery, in particular at least one button cell, by way of at least one rechargeable battery or by means of energy harvesting. The configuration of the sensor module power supply by means of the battery, the rechargeable battery or energy harvesting is sufficiently well known to a person skilled in the art, for which reason it is not discussed in more detail here.

One method step comprises evaluating the vibration data by comparing the vibration data with the comparison data. The comparison result is then produced. The vibration data may be compared with the comparison data by using the sensor module. It is also possible for the vibration data to be compared with the comparison data by using a control unit of the suction device. The suction device has the control unit for this purpose. The control unit is intended to control at least the suction device, in particular the electric motor. Furthermore, the control unit is able to compare the vibration data with the comparison data. By way of illustration, the control unit may be in the form of a microcontroller and/or in the form of a microprocessor. The comparison data may be variable by a user and/or predefined by the manufacturer. By way of example, the comparison data may be frequencies of a bandpass filter or predefinable and/or variable saturation ranges of a saturation filter. A way in which the saturation filter works can be reproduced as a mathematical function, a saturation function, $$f(x) = \begin{cases} \max & \text{for } x > \max \\ x & \text{for } \min \le x \le \max \\ \min & \text{for } x < \min \end{cases}$$

The comparison data may be stored internally to the device and/or externally to the device. By way of illustration, internally to the device may be regarded as on the sensor module of the suction device, on a storage unit of the suction device or in the control unit of the suction device in this instance. Externally to the device may be regarded here as substantially outside the suction device, such as for example on a smartphone, on a PC, on a cloud or the like. When comparing the vibration data with the comparison data, it is possible to check whether, in terms of an absolute value of the vibration data, the vibration data are above or below a predefinable and/or variable threshold for the comparison data.

After the vibration data have been compared with the comparison data, the comparison result is produced. In this case, the sensor module and/or the control unit may produce the comparison result, for example.

One method step comprises controlling the electric motor on the basis of the comparison result. In this case, the control unit may control the electric motor on the basis of the comparison result produced. The comparison result may contain information about the electric motor needing to be started, stopped or continuing to be operated. As such, controlling the electric motor, as described above, comprises starting, stopping, continuing to operate the electric motor or a performance adjustment for the electric motor. As such, for example the comparison result may comprise a start signal, a stop signal or a signal to continue to operate the electric motor. In this case, the comparison result is dependent on a result of the comparison of the vibration data with the comparison data.

The comparison result may moreover comprise information relating to a control time for the electric motor. This allows the electric motor to be controlled in such a way that the electric motor is switched on when the machine tool is started up. Moreover, it is possible for the control time to comprise a time for stopping the electric motor as soon as the machine tool stops. Furthermore, it is possible for the comparison result to comprise a switch-on and/or switch-off delay for the electric motor.

One method step comprises filtering the vibration data at a frequency of at least one signal filter in order to filter out gravitational acceleration elements in the vibration data. The signal filter may be in the form of at least one high-pass filter, a bandpass filter, a band-stop filter or a low-pass filter, the bandpass filter preferably being able to be used. The vibration data comprise not only the vibrations and/or the accelerations of the machine tool and/or of the suction device but also the gravitational acceleration elements. In order for the vibration data to be able to have the gravitational acceleration elements removed, the vibration data are filtered by means of the signal filter, in particular bandpass filter. This allows the vibration data to become independent of Earth's gravitational field. Moreover, it allows the vibration data to become independent of an orientation of the sensor module in Earth's gravitational field.

It is conceivable for there to be provision for a particular signal filter, in particular bandpass filter, for a particular component of the vibration data or else a signal filter, in particular bandpass filter, for the three-component vibration data. The signal filter, in particular bandpass filter, may have a Butterworth-based filter design, for example. Moreover, the signal filter, in particular bandpass filter, may comprise a filter order of at least one, in particular two, at the frequency, in particular a cutoff frequency, in the range from for example 100 Hz to 200 Hz. By way of example, the bandpass filter may have a Chebyshev-, Bessel- or Cauer-based filter characteristic and further filter characteristics known to a person skilled in the art. Moreover, by way of illustration, the filter order may be ascending from one. The frequency of the bandpass filter may be variable by a user or else predefined by the manufacturer. Furthermore, it is conceivable for the bandpass filter to be a digital or analog filter.

When the vibration data are filtered at the frequency of the signal filter, in particular bandpass filter, filtered vibration data may subsequently be output. It is conceivable for the filtered vibration data to be made available to a further comparison or else, in one embodiment, to be the comparison result.

One method step comprises forming a vector sum for the vibration data in order to ascertain one-component vibration data. The vibration data are typically captured as three-component vibration data by using the sensor module. In this case, the three-component vibration data map the three spatial directions. In order to ascertain the vibration data independently of a spatial direction, the vector sum of the three-component vibration data is formed. As a result, the one-component vibration data are ascertained, the one-component vibration data being independent of an attitude of the suction hose in a work environment, an orientation of the suction hose in a work environment, an orientation of the machine tool, in particular handheld machine tool, in a work environment, a connection of the suction hose to the machine tool, an orientation of the connection of the suction hose to the machine tool, a type and a manner of operation of the machine tool. The three-component vibration data have the vectors for their spatial directions added in order to achieve orientation-independent summation. This means that the vibration spectrum of the three spatial directions has the vectors added in order to obtain a one-dimensional vibration spectrum. It is possible for the vector sum of the three-component vibration data to be ascertained by using the sensor module and/or the control unit.

The one-component vibration data may be compared with at least one predefinable and/or manufacturer-defined threshold value for the one-component vibration data. The predefinable and/or manufacturer-defined threshold value may represent the comparison data here. If the vector sum is above the threshold value, for example, a start signal for the electric motor may be output as the comparison result. If the vector sum is below the threshold value, for example, a stop signal for the electric motor may be output.

Alternatively, it is also conceivable for subsequent method steps to result in no vector sum being formed from the three-component vibration data, but rather each spatial direction being evaluated separately with the associated vibration data.

One method step comprises the comparison of the vibration data with the comparison data involving checking whether the vibration data exceed the comparison data at least once within a variable number of successive variable interval widths. The variable interval widths for the vibration data may be used to ascertain, in particular count, how often the captured vibration data exceed the comparison data for successive, in particular consecutive, interval widths. This ascertained, in particular counted, number of exceedances by the vibration data may then be used to produce the comparison result. In this case, the interval width of the vibration data may be a variable width of an interval in the vibration spectrum. This means that the interval width may be a variable portion of the one-dimensional vibration spectrum.

One method step comprises filtering the, in particular one-component, vibration data with a variable saturation range of a saturation filter in order to filter the vibration data according to vibration peaks. The vibration data may comprise the vibration peaks. The vibration peaks may arise for example on account of at least one impact on the suction hose, on the suction device and/or on the machine tool. Moreover, the vibration peaks may arise, by way of illustration, on account of tremors in a work surface that are transferred to the suction device and/or the machine tool. The vibration peaks are filtered out of the vibration data in order to prevent the vibration peaks from leading to the electric motor being controlled. In this case, by way of illustration, the vibration peaks may be regarded as errors in the vibration data that distort the vibration data. The vibration peaks essentially provide no explicit information about the fact that the user is using the machine tool.

The vibration data may be compared with the variable saturation range by using the sensor module and/or the control unit in order to filter the vibration peaks. The saturation range may be variable by the user or else predefined by the manufacturer. By way of illustration, the saturation range may be in a range from 0.5 g to 2 g, in particular 0.7 g to 0.95 g.

One method step comprises ascertaining a moving maximum for at least one of the variable interval widths for the vibration data in order to ascertain the comparison result. The moving maximum may be ascertained by using the sensor module and/or the control unit. The moving maximum in this case may comprise stipulating the variable interval width. Furthermore, the moving maximum may comprise finding a maximum for the stipulated, variable interval width. The moving maximum may comprise outputting the maximum found in the stipulated, variable interval width. The maximum found within the stipulated interval width is output for a duration of the varied interval width as the comparison result. The interval width of the moving maximum in this case is a variation parameter for a sensitivity for controlling the electric motor. This means that the smaller the interval width is chosen, the faster a comparison result is output and the faster the electric motor may be controlled. This makes it possible to check whether the threshold value for the comparison result is reached continuously. The moving maximum may be regarded as an upper envelope of the vibration data.

By way of illustration, the variable interval width may be in the range from 0.01 s to 0.05 s, in particular from 0.015 s to 0.03 s. The interval width may be variable by the user or else may be predefined by the manufacturer.

One method step comprises ascertaining a change in the moving maximum of the vibration data over time in order to check the comparison result. The change in the moving maximum over time may be ascertained by using the sensor module and/or the control unit. The change in the moving maximum over time is formed for at least two successive interval widths of the moving maximum. This checks whether the comparison result is continuously compliant with the threshold value for the comparison result, which increases an accuracy of the control of the electric motor.

One method step comprises ascertaining a frequentness of the change in the moving maximum of the vibration data over time by using a moving average filter in order to check the comparison result further. The frequentness may be ascertained by using the sensor module and/or the control unit. On the basis of the ascertainment of the frequentness of the change over time, it is possible to count how often the moving maximum changes. If it is ascertained that essentially no change over time has occurred within the variable number of interval widths, then the comparison result is output in order to control the electric motor. If it is ascertained that the changes over time occur within the variable number of interval widths, then essentially no comparison result is output. This allows certain and reliable control of the electric motor to be attained.

By way of example, a factor for an interval width of the moving average filter in relation to the interval width of the moving maximum may be in the range from 1 to 9, in particular from 3 to 8. The smaller the interval width of the moving average filter is chosen, the faster the suction device is started after the machine tool starts.

It is also conceivable for a first ascertainment of the change in the moving maximum over time to result in an internal time function being activated that predefines a period when the electric motor is supposed to be controlled. The internal time function may be activated by using the sensor module and/or the control unit. The internal time function may be a function of the sensor module and/or the control unit.

One method step comprises ascertaining the moving maximum for the variable number of variable interval widths and comparing it with a variable threshold value in order to ascertain the comparison result. In this case, the sensor module and/or the control unit ascertains how frequently the moving maximum occurs in the variable interval width. The sensor module and/or the control unit subsequently compares the ascertained number with the variable threshold value in order to ascertain whether the variable threshold value has been reached. On the basis of the comparison, the comparison result is output. By way of example, the variable number of variable interval widths may be in the range from 1 to 9, in particular 3 to 8. The number of variable interval widths may be variable by the user or else may be predefined by the manufacturer.

One method step comprises operating the electric motor for a run-on period on the basis of the comparison result. The variable run-on period allows the electric motor to run on if no vibration data are captured by the sensor module. The sensor module and/or the control unit may output the comparison result so that the electric motor continues to be operated. This allows the electric motor to continue to be driven if particles still present after the end of work with the machine tool need to be sucked away. Moreover, the run-on period of the electric motor allows erroneously captured vibration data to be substantially corrected by operating the electric motor during the run-on period. This allows the electric motor to be prevented from being switched off against the wishes of the user. Furthermore, the run-on period of the electric motor allows the electric motor to be prevented from being controlled repeatedly during a single work operation by the user.

The run-on period may be variable by the user on the suction device and/or on an external electrical device or else may be predefined by the manufacturer. By way of example, the run-on period may be in a range from 0.1 s to 5 s, in particular 0.5 s to 3 s. The user is able to vary the run-on period by means of a user interface on the suction device. It is also conceivable for the user to be able to use the external electrical device, such as for example a smartphone, a cloud-based interface, a PC or the like, to vary the run-on period.

The disclosure also proposes a sensor module for carrying out the method, as described above, the sensor module being designed to capture vibration data.

The disclosure also relates to a suction device for carrying out the method, as described above, having a suction hose, the suction hose comprising at least one sensor module for capturing vibration data, and having a control unit, the control unit being designed to carry out at least one of the method steps described above. In this case, the suction hose, the sensor module and the control unit are as described at the outset.

BRIEF DESCRIPTION OF THE DRAWINGS

The disclosure is explained below on the basis of a preferred embodiment. In the drawings that follow.

DETAILED DESCRIPTION

Figure 1:
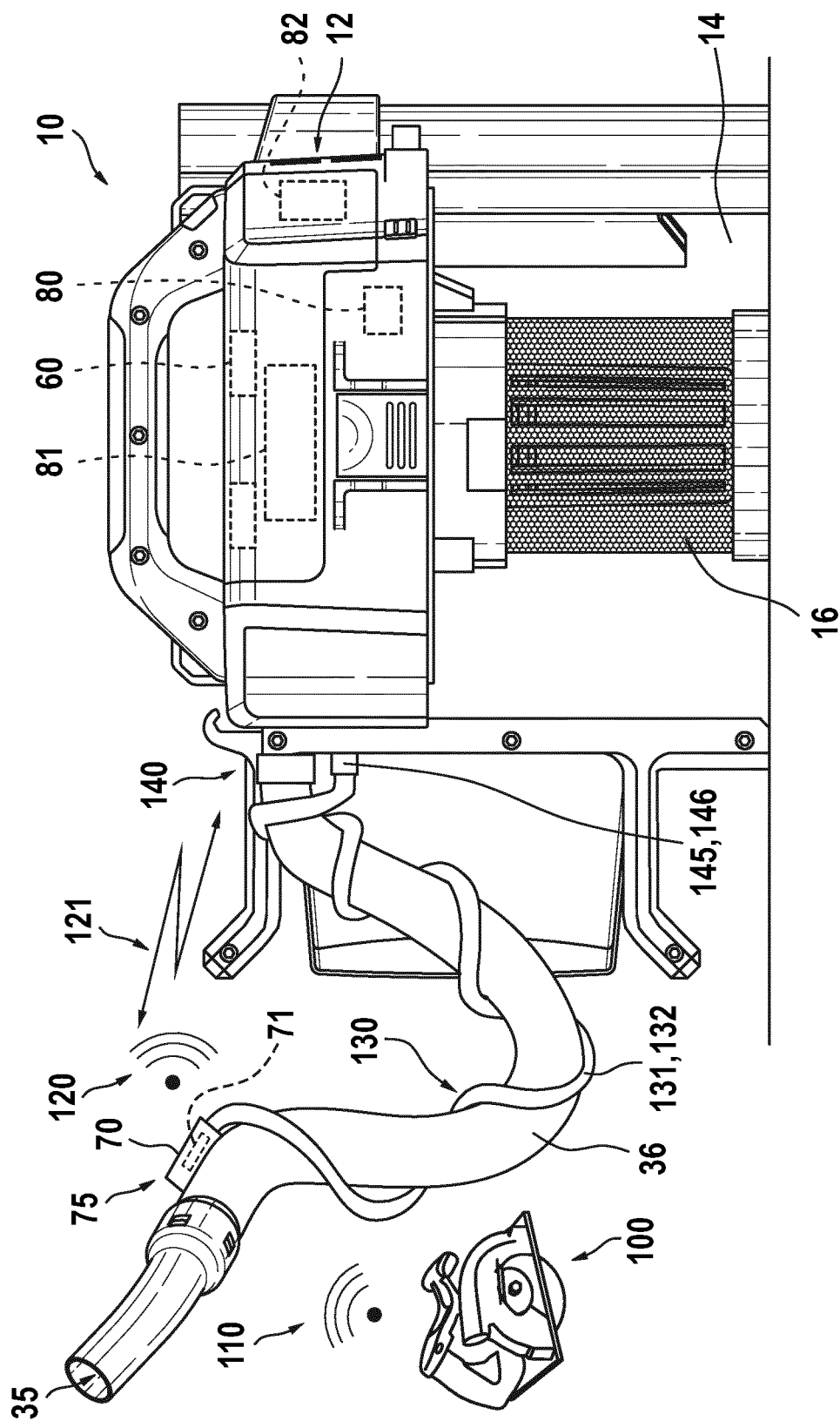
FIG. 1 shows a schematic view of a suction device according to the disclosure.

FIG. 1 shows a suction device 10 according to the disclosure with a suction device housing 12 and with a suction hose 36. In this configuration, the suction hose 36 is attachable to the suction device housing 12 in a detachable manner. Moreover, the suction device 10 has a sensor module 70. The sensor module 70 is arranged on the suction hose 36. The sensor module detects vibrations 110 of a machine tool 100, in particular a handheld machine tool, and of the suction device 10. The sensor module 70 here is in the form of an acceleration sensor 71. The acceleration sensor 71 detects the vibrations 110 in up to three spatial directions and converts the vibrations 110 into vibration data 120. In this case, the vibration data 120 comprise one particular component for one particular spatial direction for different times. The sensor module 70 provides a communication connection 121 to the suction device 10 and transmits the vibration data 120 to the suction device. In this configuration, the machine tool 100 is shown as an illustrative handheld circular saw.

The suction device 10 has an electric motor 80 for producing a suction function, a power supply unit 81, a dust collection apparatus 14 and a dust collection filter element 16. The suction device housing 12 comprises the dust collection apparatus 14 in this case. The suction device 10 additionally comprises a control unit 60, which is designed to process the vibration data 120 and to control and/or regulate the suction device 10.

In this embodiment, the suction device 10 is in the form of a battery-operated suction device operated by means of at least one rechargeable battery 82, in particular by means of a handheld machine tool battery pack. The power required for the suction device 10 is thus provided by the power supply unit 81 by means of the at least one rechargeable battery 82.

The suction hose 36 comprises a suction opening 35 and is attachable to the suction device housing 12 in a detachable manner. The suction opening 35 is adapted to pick up particles that are produced, in particular dirt particles, during operation of the suction device 10 and to forward them to the dust collection apparatus 14 by means of the suction hose 36. The suction hose 36 is detachably connectable to the machine tool 100, in particular the handheld machine tool. The suction hose 36 comprises the sensor module 70, the sensor module 70 being attached and therefore mechanically connected to an end region 75 of the suction hose 36.

The suction device 10 is connected to the sensor module 70 by cable. For this purpose, the suction hose 36 has a line 130 for cable connection between the suction device 10 and the sensor module 70. In this embodiment, the line 130 comprises a communication line 131 and a power supply line 132. The communication line 131 transmits the vibration data 120 between the sensor module 70 and the suction device 10. The power supply line 132 connects the sensor module 70 to the suction device 10 so that the sensor module 70 is supplied with power.

The suction device housing 12 comprises a mechanical interface 140 and a communication interface 145. The mechanical interface 140 is designed to connect the suction hose 36 to the suction device housing 12 in a detachable manner. This is accomplished essentially by means of a force-fit and/or form-fit connection. The communication interface 145 is intended to connect the sensor module 70 to the suction device 10. The communication interface 145 connects the sensor module 70 to the suction device 10 by means of the communication line 131. In this embodiment, the communication line 131 is connected to the communication interface 145 in a detachable manner by way of a plug-in connection. Additionally, the communication interface 145 is a power supply interface 146 for the power supply line 132. The power supply interface 146 connects the sensor module 70 to the power supply unit 81 by way of the power supply line 132.

Figure 2:
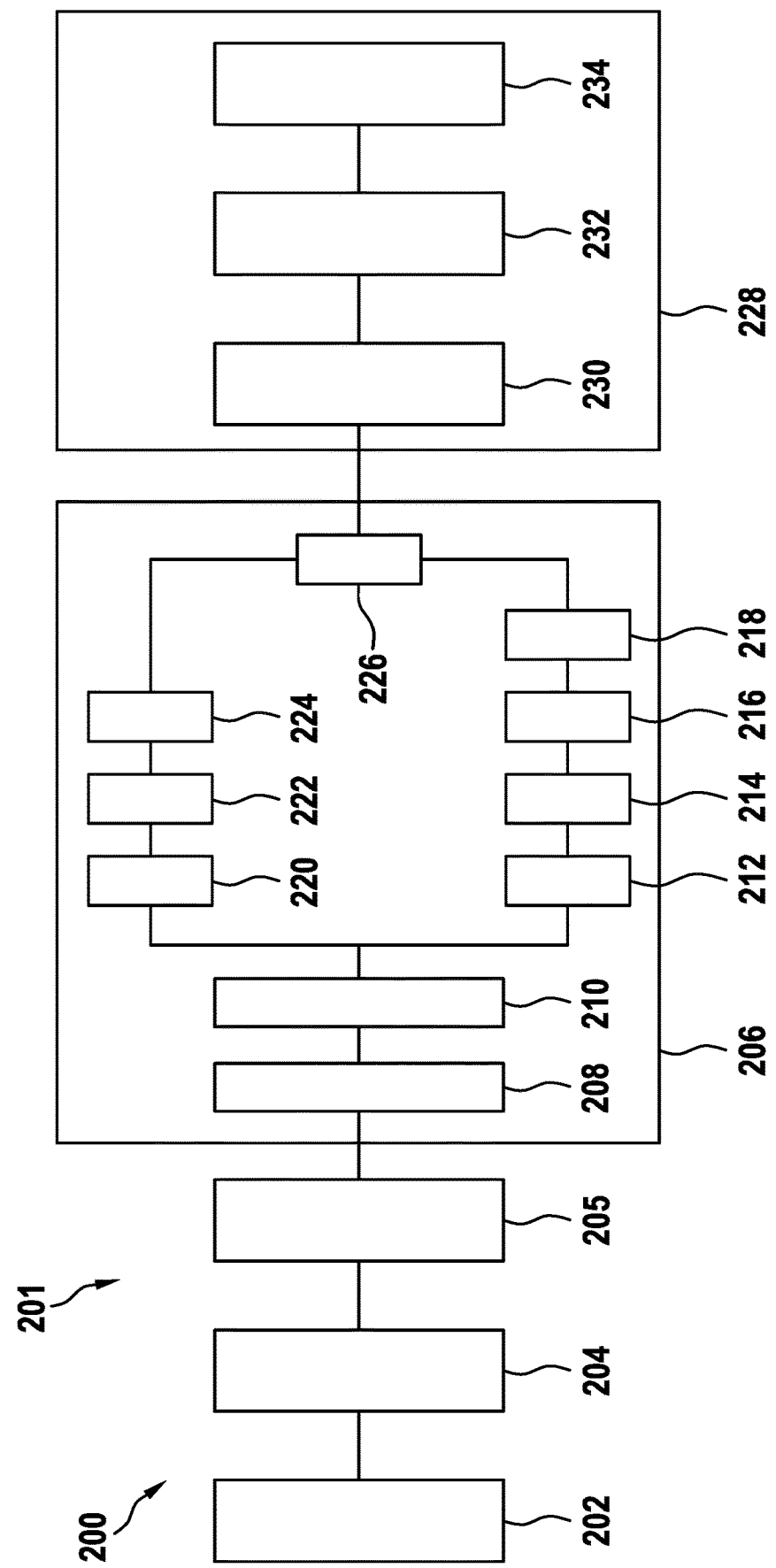
FIG. 2 shows a flowchart for a method for controlling the suction device.

FIG. 2 shows a flowchart 201 for a method 200 according to the disclosure for controlling the suction device 10. The suction device 10 has the electric motor 80 for producing the suction function. A method step 202 comprises a user activating an autostart function of the suction device 10. This puts the suction device 10 into a ready state.

The vibration data 120 are captured at the suction hose 36 in a method step 204. The sensor module 70 detects the vibrations 110 and converts the vibrations 110 into the vibration data 120. The vibration data 120 essentially comprise vibration values and/or acceleration values for the up to three spatial directions, which means that the vibration data 120 are three-component vectors for different times. The vibration data 120 are represented in a vibration spectrum, the vibrations with their amplitudes over a particular spatial direction being plotted over a time axis.

The captured vibration data 120 are transmitted from the suction hose 36 to the suction device 10 by using the communication connection 121 in a method step 205 in this embodiment. A subsequent method step 206 comprises evaluating the vibration data 120 by comparing the vibration data 120 with comparison data. Moreover, the comparison result is produced. Here, the vibration data 120 are compared with the comparison data by using the control unit 60. By way of illustration, the comparison data may be frequencies of a signal filter and predefinable saturation ranges of a saturation filter. Here, the comparison data are stored internally to the device on a storage unit of the control unit 60. The vibration data 120 are compared with the comparison data in method step 206 and a check is performed to ascertain whether the vibration data are within or outside a predefinable threshold for the comparison data. On the basis of this comparison, the comparison result is produced.

Method step 206 comprises a method step 208. The vibration data 120 are filtered in method step 208 at a frequency of a signal filter in order to filter out the gravitational acceleration element in the vibration data 120. Here, the signal filter is in the form of a bandpass filter. The vibration data 120 have the gravitational acceleration elements removed and the vibration data 120 are substantially independent of Earth's gravitational field. Moreover, the vibration data 120 are allowed to become independent of an orientation of the sensor module 70 in Earth's gravitational field. The bandpass filter filters the three-component vibration data 120 according to the gravitational acceleration elements in method step 208. The bandpass filter has a filter order of two here, the frequency comprising a range from 100 Hz to 200 Hz. In this embodiment, the frequency of the bandpass filter is predefined by the manufacturer. The control unit 60 comprises the bandpass filter here.

Method step 206 has a method step 210 that follows method step 208. Method step 210 comprises forming a vector sum for the vibration data 120. Here, the control unit 60 forms the vector sum of the vibration data 120. The vector sum of the three-component vibration data 120 allows one-component vibration data 120 to be ascertained. This means that the vibration spectrum with its three spatial directions has the vectors added in order to ascertain a one-dimensional vibration spectrum. The one-component vibration data 120 are independent of an attitude of the suction hose 36 in a work environment, an orientation of the suction hose in a work environment and a main direction of oscillation of the machine tool 100 connected to the suction device 10. In the case of the vector sum in method step 210, the three-component vibration data 120 have the vectors added in order to allow orientation-independent summation. The vector sum is formed by using the control unit 60 in this embodiment. Method step 210 moreover comprises comparing the one-component vibration data 120 with a manufacturer-defined threshold value for the one-component vibration data 120, and outputting the comparison result. The manufacturer-defined threshold value forms the comparison data here. If the result of the comparison of an absolute value of the vector sum with the threshold value is that the vector sum is above the threshold value, a start signal for the electric motor 80 is output as the comparison result. If the result of the comparison of the absolute value of the vector sum with the threshold value is that the vector sum is below the threshold value, a stop signal for the electric motor 80 is output.

Method step 206 also comprises the comparison of the vibration data 120 with the comparison data involving checking whether the vibration data 120 exceed the comparison data at least once within a variable number of successive variable interval widths. The interval width of the vibration data 120 is a variable width of an interval in the one-dimensional vibration spectrum. The interval width here is thus a variable portion of the one-dimensional vibration spectrum.

The variable interval widths for the vibration data 120 may be used to ascertain, in particular count, how often the captured vibration data 120 exceed the comparison data for successive, in particular consecutive, interval widths. This ascertained, in particular counted, number of exceedances by the vibration data 120 is then used to produce the comparison result. In this case, the interval width of the vibration data 120 is a variable width of an interval in the vibration spectrum. This means that the interval width is a variable portion of the one-dimensional vibration spectrum.

Moreover, method step 206 comprises a method step 212. Method step 212 follows method step 210. The vibration data 120 are compared with a variable saturation range of a saturation filter in method step 212 in order to filter the vibration data 120 according to vibration peaks. The vibration data 120 are compared with the variable saturation range by using the control unit 60. By way of illustration, the saturation range is in a range from 0.7 g to 0.95 g.

Furthermore, method step 206 has a method step 214. Method step 214 follows method step 212. Method step 214 comprises ascertaining a moving maximum for at least one of the variable interval widths for the vibration data 120. Ascertaining the moving maximum comprises the method steps of stipulating the variable interval width, finding a maximum for the stipulated, variable interval width and outputting the maximum found in the stipulated, variable interval width. The maximum found in the stipulated, variable interval width is the comparison result here. By way of illustration, the variable interval width is in the range from 0.01 s to 0.05 s.

A change in the moving maximum of the vibration data 120 over time is ascertained in a method step 216. Method step 206 comprises method step 216, method step 216 following method step 214. The change over time is used to check the comparison result. The change over time is ascertained by using the control unit 60.

A frequentness of the change in the moving maximum of the vibration data 120 over time is ascertained in a method step 218. Method step 206 comprises method step 218. Method step 218 follows method step 216. Here, the frequentness of the change over time is ascertained by using a moving average filter in order to check the comparison result further. Moreover, the frequentness is ascertained by using the control unit 60. After the frequentness has been compared with a variable number of interval widths, the comparison result is output. By way of illustration, a factor for an interval width of the moving average filter in relation to the interval width of the moving maximum is in the range from 1 to 9 here.

Method steps 212, 214, 216, 218 form a first embodiment for comparing the vibration data 120 with the comparison data in order to ascertain the comparison result.

A method step 226 comprises producing the comparison result by using the control unit 60, and controlling the electric motor 80. It is possible for the comparison result to be output to the electric motor 80 after a time delay by means of an internal time function so that the electric motor 80 is controlled after a time delay. The internal time function is used for delayed control of the electric motor.

Method steps 220, 222, 224 form a second embodiment for evaluating the vibration data 120 by way of comparison with the comparison data in order to ascertain the comparison result. Method step 206 additionally comprises method steps 220, 222, 224. Method step 226 also outputs the comparison result from method steps 220, 222, 224.

Method step 220 comprises ascertaining the moving maximum for the variable interval width for the vibration data 120 in order to ascertain the comparison result. The moving maximum of method step 220 is ascertained in method step 222 for the variable number of variable interval widths. Here, the variable number is ascertained by using the control unit 60. Method step 224 comprises comparing the ascertained, variable number with a variable threshold value and ascertaining the comparison result. The comparison of the ascertained, variable number with the variable threshold value is performed by using the control unit 60. As soon as the comparison result has been ascertained, the comparison result is produced and output in method step 226.

The electric motor 80 is controlled in a method step 228 on the basis of the comparison result by using the control unit 60. Method step 228 comprises method steps 230, 232, 234. Method step 230 comprises starting the electric motor 80 on the basis of the comparison result. In this case, the electric motor 80 is operated until the comparison result comprises a different piece of information. Method step 232 comprises stopping the electric motor 80 by using the control unit 60 on the basis of the comparison result. Additionally, the electric motor 80 may be operated for a run-on period in method step 234 on the basis of the comparison result. The run-on period here is variable on the suction device 10 by the user. The run-on period may be in a range from 0.1 s to 5 s.

The invention claimed is:

1. A method for controlling a suction device, which includes at least one electric motor for at least producing a suction function, the method comprising:
    capturing vibration data at a suction hose of the suction device;
    filtering the captured vibration data at a frequency of at least one signal filter in order to filter out gravitational acceleration elements in the captured vibration data;
    evaluating the filtered captured vibration data by comparing the filtered captured vibration data with comparison data so as to produce a comparison result; and
    controlling the at least one electric motor based on the comparison result.

2. The method as claimed in claim 1, further comprising:
    forming a vector sum for the filtered captured vibration data in order to ascertain one-component vibration data.

3. The method as claimed in claim 1, wherein the comparison of the filtered captured vibration data with the comparison data includes checking whether the filtered captured vibration data exceed the comparison data at least once within a variable number of successive variable interval widths.

4. The method as claimed in claim 3, further comprising:
    comparing the filtered captured vibration data with a variable saturation range of a saturation filter in order to filter the vibration data according to vibration peaks.

5. The method as claimed in claim 3, wherein the comparison of the filtered captured vibration data with the comparison data includes ascertaining a moving maximum for at least one of the variable number of successive variable interval widths for the filtered captured vibration data in order to ascertain the comparison result.

6. The method as claimed in claim 5, further comprising:
    ascertaining a change in the moving maximum over time in order to check the comparison result.

7. The method as claimed in claim 6, further comprising:
    ascertaining a frequentness of the change in the moving maximum using a moving average filter in order to check the comparison result further.

8. The method as claimed in claim 5, wherein the comparison of the filtered captured vibration data with the comparison data includes comparing the moving maximum with a variable threshold value in order to ascertain the comparison result.

9. The method as claimed in claim 1, further comprising:
    transmitting the captured vibration data or the comparison result from the suction hose to the suction device by using a communication connection.

10. The method as claimed in claim 1, further comprising:
    operating the electric motor for a run-on period on the basis of the comparison result.

11. A suction device comprising:
    at least one electric motor configured to produce a suction function;
    a suction hose comprising at least one sensor module configured to capture vibration data; and
    a control unit configured to:
        filter the captured vibration data at a frequency of at least one signal filter in order to filter out gravitational acceleration elements in the vibration data;
        evaluate the filtered captured vibration data by comparing the filtered captured vibration data with comparison data so as to produce a comparison result; and
        control the at least one electric motor based on the comparison result.

* * * * *